(12) United States Patent
Ho et al.

(10) Patent No.: US 8,925,010 B2
(45) Date of Patent: Dec. 30, 2014

(54) METHOD AND SYSTEM FOR TELEVISION CHANNEL GROUP

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 1185 days.

(21) Appl. No.: 11/804,370

(22) Filed: May 19, 2007

(65) Prior Publication Data

US 2008/0244641 A1 Oct. 2, 2008

Related U.S. Application Data

(63) Continuation-in-part of application No. 11/731,461, filed on Apr. 2, 2007.

(51) Int. Cl.
| | |
|---|---|
| H04N 5/445 | (2011.01) |
| H04N 5/50 | (2006.01) |
| H04N 5/45 | (2011.01) |
| H04N 7/01 | (2006.01) |
| H04N 21/462 | (2011.01) |
| H04N 21/426 | (2011.01) |
| H04N 21/431 | (2011.01) |
| H04N 21/434 | (2011.01) |
| H04N 21/4363 | (2011.01) |
| H04N 21/482 | (2011.01) |
| H04N 21/84 | (2011.01) |
| H04N 1/00 | (2006.01) |
| G06F 3/00 | (2006.01) |
| G06F 13/00 | (2006.01) |

(52) U.S. Cl.
CPC ............. *H04N 5/50* (2013.01); *H04N 5/44543* (2013.01); *H04N 5/45* (2013.01); *H04N 7/0122* (2013.01); *H04N 21/4622* (2013.01); *H04N 21/4263* (2013.01); *H04N 21/4316* (2013.01); *H04N 21/4348* (2013.01); *H04N 21/43635* (2013.01); *H04N 21/4823* (2013.01); *H04N 21/84* (2013.01); *H04N 1/00442* (2013.01); *G06F 3/00* (2013.01); *G06F 13/00* (2013.01)
USPC .................................. 725/44; 725/37; 725/41

(58) Field of Classification Search
CPC ........ H04N 1/00442; G06F 3/00; G06F 13/00
See application file for complete search history.

(56) References Cited

U.S. PATENT DOCUMENTS

| | | | |
|---|---|---|---|
| 2002/0013941 A1* | 1/2002 | Ward et al. ...................... 725/25 |
| 2002/0067376 A1* | 6/2002 | Martin et al. ................. 345/810 |
| 2003/0229900 A1* | 12/2003 | Reisman ......................... 725/87 |
| 2007/0011702 A1* | 1/2007 | Vaysman ....................... 725/45 |
| 2010/0122294 A1* | 5/2010 | Craner ............................ 725/41 |

* cited by examiner

*Primary Examiner* — Nathan Flynn
*Assistant Examiner* — James R Marandi
(74) *Attorney, Agent, or Firm* — North Shore Patents, P.C.; Michele Liu Baillie

(57) ABSTRACT

Provided is a method and system for displaying video from a plurality of video streams on a display. It includes an input interface for receiving video data from a plurality of video streams and transferring the video data to a frame controller in communication with a television display. The frame controller causes the video data from each of the plurality of different video streams to be displayed in a separate frame on the television display, and each frame occupying an area of the television display separate from an area occupied by any other frame. The frame controller displays a channel group on the television display. The channel group comprises a list of channels sharing at least one common attribute.

34 Claims, 14 Drawing Sheets

| Channel Group 460e | Channel Group 460f |
|---|---|
| Channel 461 HBO Latino | Channel 461 Disney |
| Channel 463 Gol TV | Channel 463 Cartoon |
| Channel 465 Video Rola | Channel 465 ABC Family |
| Channel 468 Pop Latino | Channel 468 Animal Plannet |
| Channel 469 HTV Musica | Channel 469 Nickelodeon |

| Channel Group 460g | Channel Group 460h |
|---|---|
| Channel 461 Food Network | Channel 461 Hot Choice |
| Channel 463 Travel Channel | Channel 463 Playboy |
| Channel 465 Turner Classic | Channel 465 Spike |
| Channel 468 EWTN | Channel 468 CLUB Jenna |
| Channel 469 Home&Garden | Channel 469 FLESH! |

Figure 5b

METHOD AND SYSTEM FOR TELEVISION CHANNEL GROUP

REFERENCE TO RELATED APPLICATIONS

This application is a continuation-in-part of U.S. application Ser. No. 11/731,461 entitled "SYSTEM AND METHOD FOR PRESENTING MULTIPLE PICTURES ON A TELEVISION" filed on Mar. 30, 2007, which is assigned to a common assignee.

FIELD OF THE INVENTION

This invention generally relates to television, and more particularly, to a system and method for organizing television channel groups.

BACKGROUND OF THE INVENTION

The introduction of High Definition Television (HDTV) and the flat panel display has led to new and pleasant experience in watching television. The slimness of a flat panel television set saves space and allows a consumer to place a larger television in a room of limited size. HDTV sets support high resolution and better picture quality. Many HDTV sets sold today are flat panel television sets.

Along with the improved resolution and picture quality, the trend in HDTV sales has been towards a general increase in the size of the average television display. For example, in United States, the average size of a HDTV set sold is now approximately 30 inches, diagonal. In some Asian countries, the average size is even larger than 32 inches.

A large screen allows a consumer to more comfortably view multiple pictures. For example, a consumer may watch the Super Bowl on a large picture on the display screen, while simultaneously viewing an NBA game between the Sacramento Kings and the LA Lakers on a smaller picture, a local college basketball between Stanford and Berkeley on a third picture, and a hockey game between New York Islanders and Anaheim Ducks on a fourth picture on the television display. Not to miss any important news, the consumer may view CNN or FOX on a fifth picture. Last but not least, they may also view a sixth picture, such as from a baby monitor their 8-month old baby's room, at the same time. On a traditional smaller television screen, having six picture frames displaying simultaneously on the screen would necessitate that at least some of the picture frames would be so small as to be difficult to view at an average or normal viewing distance. With the large screen, however, more the larger display area allows for more picture detail to be discerned at the same distance than with a smaller television screen.

Currently, there are several ways to view multiple pictures simultaneously on a television set. Picture in picture (PIP) allows two pictures to be shown on a television set at the same time, with a smaller picture displayed on top of, or overlaying, a larger picture. Since the smaller picture overlays the larger picture, the larger picture is not entirely visible. This is often extremely inconvenient, as the overlaid picture may cover a portion of the larger picture of interest to the viewer. For example, the overlaid portion might cover the end zone of a football game.

In addition, many cable television and satellite television networks carry numerous channels. A subscriber typically gets over 50 channels, even for basic services, and it is not uncommon for a subscriber to have over 100 channels available with a typical subscription. Particularly in a multiple picture environment, in which the number of channels that can be viewed at one time is increased, a user may desire a means to easily select channels for viewing.

Moreover, advances in Internet video and television potentially makes available thousands of channels. Navigating through so many available channels becomes a daunting task. There are a number of ways to deal with the problem. Video on demand (VOD) allows a user to select a television program they want to watch, but this method is most effective only for a small number of television programs. The next time the user wants to watch television, they have to select a television program again.

Also, VOD relates to television programs and not to television channels. For example, if Mary wants to watch television programs about homes and gardens, she may use VOD to select a "24 Hour Design" show from House and Garden Television channel (HGTV). On the next day, Mary turns on the television to watch some more house and garden shows, but instead of seeing the HGTV channel, she finds a VOD screen waiting for her to once again select a program.

Another way of navigating through the channels is to use the programmed channel list feature of televisions and set-top boxes. A user may remove television channels they do not like. For example, Bob does not shop on television and is not interested in local community affairs. Thus, he removes all home shopping television channels and local community television channels from the programmed channel list. Bob is happy. Mary, Bob's wife, likes to shop but does not enjoy sports on television. Mary removes sports channels from the programmed channel list. Mary finds the home shopping channels were removed, and adds them back to the programmed channel list. Later that evening, Bob wants to watch a tennis final match on ESPN, a sports channel. Bob cannot find it on the programmed channel list.

Thus, particularly in a multiple picture environment, there is a need to organize television channels into a plurality of television channel groups.

SUMMARY OF THE INVENTION

An aspect of the present invention provides a television system and method including an input interface for receiving video data from a plurality of video streams and transferring the video data to a frame controller in communication with a television display. Each of the plurality of video streams has a display aspect ratio, and the frame controller causes the video data from each of the plurality of different video streams to be displayed in a separate frame on the television display. Each frame occupies an area of the television display separate from an area occupied by any other frame. The frame controller further causes display of a channel group comprising a list of channels in at least one of the separate frames on the television display. Each channel includes a plurality of serially-available video streams sharing at least one common attribute.

In another aspect of the invention, the input interface receives video data from one or more sources selected from the list including broadcast television, cable television, satellite television, video cassette player (VCR), and digital versatile disk (DVD).

In one aspect of the invention, the input interface receives video data in one or more of the following formats: NTSC, PAL, and HDTV.

In another aspect of the invention, the input interface includes one or more of a coaxial interface, a radio frequency (RF) interface, a high-definition multimedia interface (HDMI), component interface, composite interface, an Ethernet interface, or a wireless network interface.

In one aspect of the invention, the input interface includes a wireless network. Any wireless network may be used, including a Wireless Local Area Network (WLAN), a Worldwide Interoperability for Microwave Access (WiMax) network, or and Ultra-wideband (UWB) network.

In another aspect of the invention, the common attribute for the channel group is one of sports, news, or movies.

In another aspect of the invention, the common attribute for the channel group is one of ethnicity, language or culture.

In another aspect of the invention, the common attribute for the channel group is one of age appropriateness, age preference, or age restricted.

In another aspect of the invention, the common attribute for the channel group is selected by a user. In an aspect of the invention, the user selects the common attribute from a list of common attributes.

Another aspect of the invention also allows the user to provide a key to the frame controller and for the frame controller to require the provided key to be used when access to a channel group or to a display channel in the channel group is attempted.

Another aspect of the invention also provides that a key must be verified by the frame controller with a multi-access network or data network in order for access to a channel group or to a display channel in the channel group to be allowed.

BRIEF DESCRIPTION OF THE DRAWINGS

FIG. 5b is a schematic diagram illustrating a channel group, in accordance with an embodiment of the present invention;

DETAILED DESCRIPTION

Figure 1:
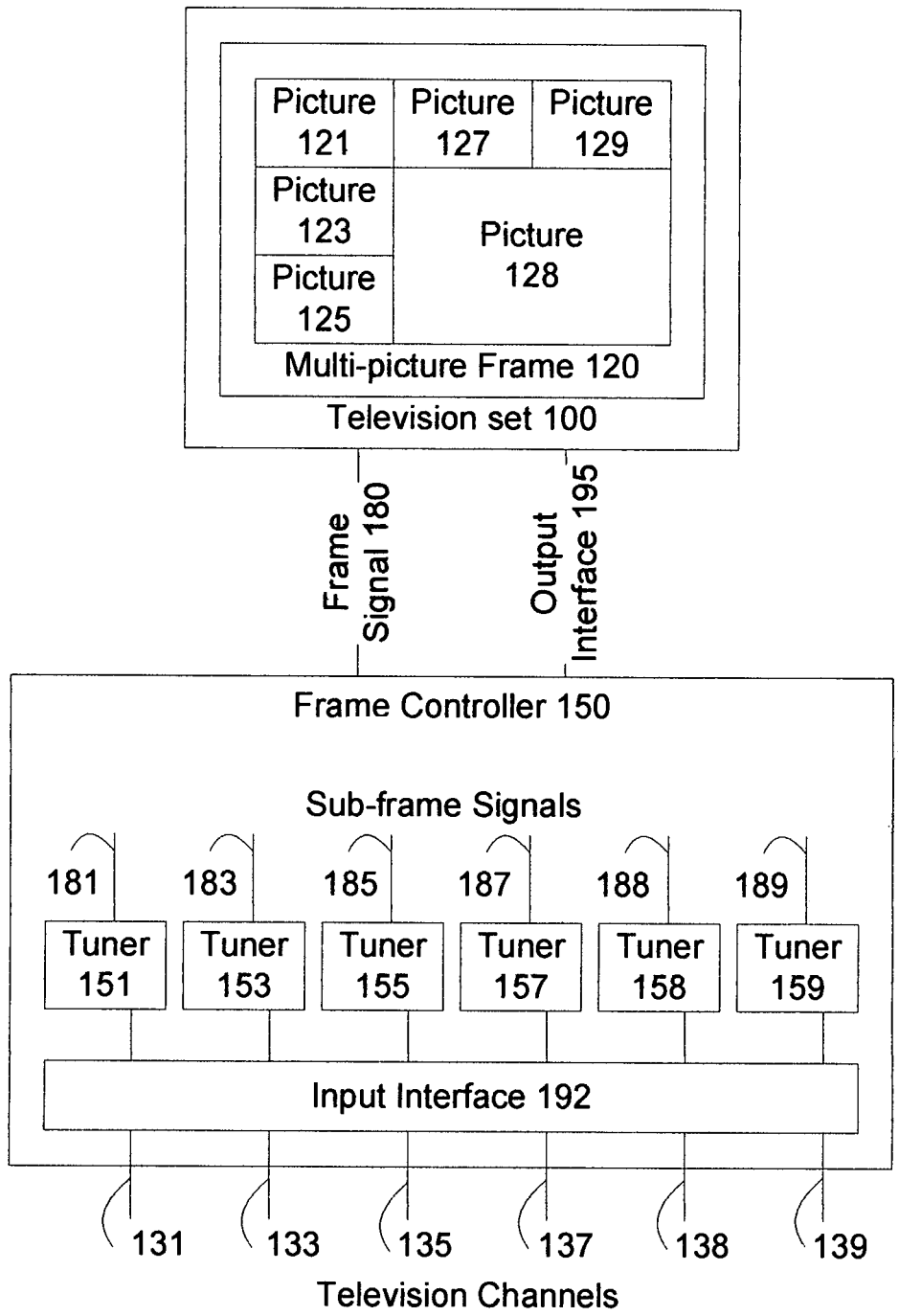
FIG. 1 is a schematic diagram illustrating a television set with a multi-picture frame.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The term "video data" referred to in the descriptions of various embodiments of the invention herein described is intended to generally describe electronic audio and video signals containing or incorporating video for display on a television or other video display device. This term is used in the broadest sense as known in the electronic arts, and may include analog and/or digital signals. Likewise, the term "video stream" is used in a non-limiting fashion and generally refers to the collection of video data, together with any carrier signals, data headers or other electronic information, which singularly or taken together allow the described embodiments to operate. For example, a digital video stream from a given video source might include multiple packets of compressed video data, each packet or group thereof having one or more packet headers. Typically, one or more of the headers includes information relating to the video data, such as the compression algorithm used, the aspect ratio, etc.

The term "aspect ratio" referred to in the descriptions of the various embodiments of the invention herein described refers to the ratio of the width of the video display image to the height of the video display image. For most NTSC television display images the current aspect ratio is 4:3. High-definition Television (HDTV) uses an aspect ratio of 16:9, which is similar to the aspect ratio used by motion pictures. Reference herein to displaying a video stream in a frame having a height and a width proportional to the video stream's aspect ratio means that an HDTV video stream is displayed filling a frame having a width:height ratio of 16:9. Similarly, a standard NTSC television video stream would be displayed filling a frame having a Width:height ration of 4:3.

As used herein, the terms "picture frame" and "frame" refer to the borders of a displayed picture. Unless otherwise specified, a picture frame does not necessarily have a border of any particular width, i.e., a displayed picture might occupy the entire area of the picture frame, or the picture frame may include a border. Reference to locations on a display device may be made by referring to either the location of the picture frame or to the location of displayed picture itself, without limitation. Reference to the size of a picture frame refers to the height and width of the frame, and frames of differing width and/or differing height are referred to as being of different sizes.

As used herein, the term "picture" refers to the whole of the display image and its picture frame, unless otherwise indicated, without limitation.

An embodiment of the present invention advantageously provides for the display of multiple pictures on a high resolution large screen television set without overlaying another picture, while preserving the high resolution and aspect ratio of the displayed pictures.

FIG. 1 is a block diagram of a television set 100 displaying a multi-picture frame and a frame controller 150. Television set 100 is an electronic device that receives and displays images and sounds. In one embodiment, television set 100 receives images and sounds as video data or a video stream from a television channel 131, which may originate from a broadcast television network, a cable television network, a satellite television network, or Internet Protocol television (IPTV) network. Alternatively, the video data may originate from a VCR, a DVD player, a digital video recorder (DVR), a set top box, or any other video source.

In an embodiment, television set 100 includes a screen capable of displaying a multi-picture frame 120 large enough for a user to comfortably watch multiple pictures from 6 feet away. In one embodiment television set 100 has a screen size of at least 32 inches, or 80 cm. In another embodiment, a user watches television set 100 from 15 feet away, and the screen size is at least 60 inches or 150 cm.

Multi-picture frame 120 includes multiple pictures 121, 123, 125, 127, 128, 129. Picture 128 is a major picture having a display size larger than the smaller pictures 121, 123, 125, 127 and 129. Multi-picture frame 120 differs from picture-in-picture (PIP) in that a small picture does not overlay over the large picture 128 in multi-picture frame 120. Moreover, the large picture 128 does not occupy the full screen, as in a conventional PIP.

In an exemplary embodiment, television set 100 has a screen size of 32 inches diagonal, picture 128 has a size of 22 inches diagonal, and picture 121 has a size of 9 inches diagonal. In another exemplary embodiment, television set 100 has a screen size of 40 inches diagonal, picture 128 has a size of 27 inches diagonal, and picture 121 has a size of 12 inches diagonal. In still another exemplary embodiment, television set 100 has a screen size of 60 inches diagonal, picture 128 has a size of 42 inches diagonal, and picture 121 has a size of 16 inches diagonal.

In various embodiments, picture 128 may have a picture resolution and aspect ratios of NTSC standard, defined by National Television System Committee, Phase Alternating Line (PAL), DVD video, or HDTV. In one embodiment, picture 128 has a better picture resolution than NTSC, PAL or HDTV.

The layout of the multiple pictures depicted in FIG. 1 is exemplary in nature. In various embodiments the number, dimensions and positions of the various pictures or picture frames may differ. For example, in one embodiment the size of large picture 128 is as depicted, but the sizes of the small pictures are different.

Figure 1A:
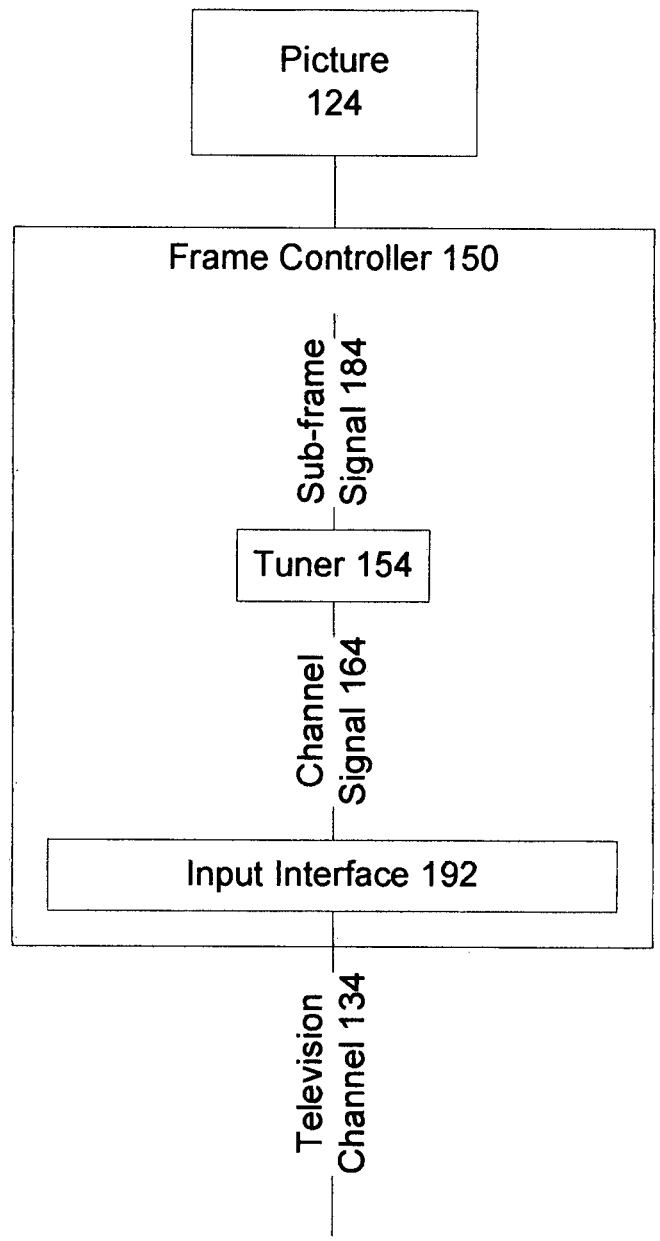
FIG. 1a is a schematic diagram illustrating a picture and a frame controller in accordance with an embodiment of the present invention.

FIG. 1a is a block diagram depicting a picture 124 and a frame controller 150. Picture 124 can be a larger picture 128 or smaller picture 127, as depicted in FIG. 1. In an embodiment, picture 124 displays images and sounds, i.e., the video signal of television channel 134. In one embodiment, picture 124 displays cable television channel 34, or video from a DVD player. Typically different pictures such as picture 123 and picture 129 display different television channels 133 and 139. For example, in one embodiment, picture 123 displays cable television channel 34, picture 129 displays broadcast television channel 48, picture 123 displays satellite television channel 93, and picture 127 displays a movie from a VCR.

Referring once again to FIG. 1, in an embodiment of the invention, pictures 121, 123, 125, 127, 128, and 129 display television channels 131, 133, 135, 137, 138 and 139, respectively.

In one embodiment, television 120 displays the sounds of the largest picture 128 and not of other pictures. Alternatively, in another embodiment, television 120 may display the sounds of picture 129 or of another picture as selected by the user.

Frame controller 150 controls multi-picture frame 120. In an embodiment, frame controller 150 includes input interface 192 connecting to television channels 131, 133, 135, 137, 138 and 139. Input interface 192 may include any of a coaxial interface, a Radio Frequency (RF) interface, a High-Definition Multimedia interface (HDMI), a component interface such as YPbPr or YCbCr interface, a composite interface, an Ethernet interface, or a wireless network interface. Frame controller 150 receives video streams of the said television channels from the input interface 192.

Frame controller 150 connects to television set 100. In one embodiment, frame controller 150 includes an output interface 195 connecting to television set 100. Frame controller 150 sends frame signal 180 for multi-picture frame 120 over output interface 195 to television set 100. In one embodiment, output interface 195 may include an RF interface, an HDMI interface, an S-video interface, a component interface, or a composite interface. Output interface 195 may includes a wireless network such as a Wireless Local Area Network (WLAN), a Worldwide Interoperability for Microwave Access (WiMax), or an Ultra-Wideband (UWB) network.

Referring back to FIG. 1a, frame controller 150 includes a tuner 154 handling a video stream or signal for picture 124. Based on television channel 134 of picture 124, tuner 154 selects television channel 134 from input interface 192, receives the video stream or signal 164 of television channel 134, transforms channel video stream or signal 164 to sub-frame signal 184.

In FIG. 1, frame controller 150 includes multiple tuners 151, 153, 155, 157, 158, 159 corresponding to multiple pictures 121, 123, 125, 127, 128, and 129, accordingly. Tuners 151, 153, 155, 157, 158 and 159 generate sub-frame signals 181, 183, 185, 187, 188 and 189. Frame controller 150 combines sub-frame signals 181, 183, 185, 187, 188 and 189 into frame signal 180, and transmits frame signal 180 over output interface 195 to television set 100. Television set 100 subsequently displays frame signal 180.

In one embodiment, television set 100 includes the frame controller 150. In such an embodiment the output interface 195 may be an internal bus or other connection within the television set 100.

Figure 2:
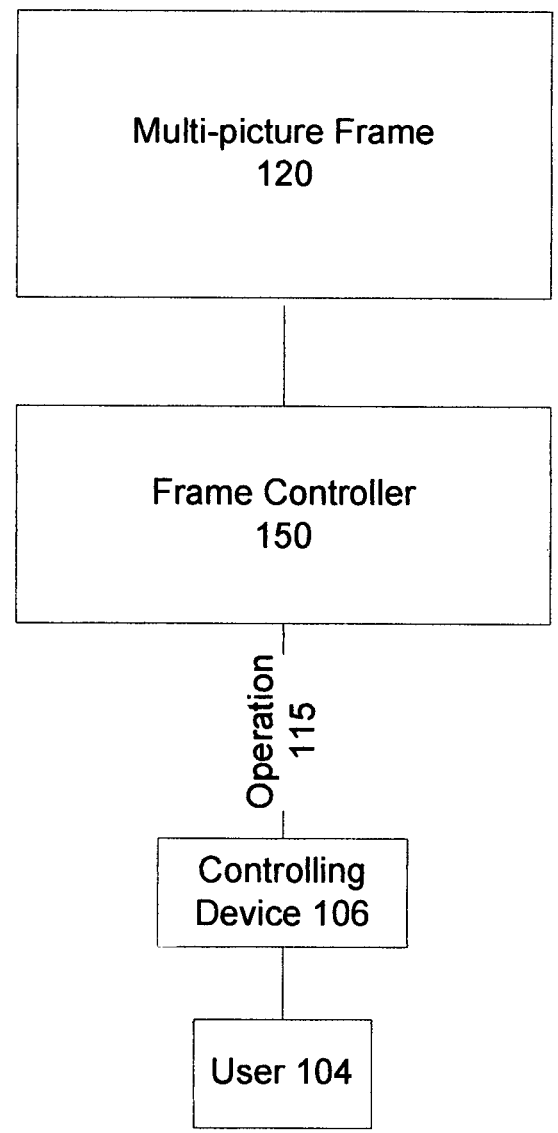
FIG. 2 is a schematic diagram illustrating controlling operations of a multi-picture frame, in accordance with an embodiment of the present invention.

FIG. 2 illustrates controlling operations of a multi-picture frame 120. In an embodiment of the invention, frame controller 150 controls operations of the multi-picture frame 120, and a user 104 uses a controlling device 106 to instruct frame controller 150. Frame controller 150 connects to the controlling device 106 through, for example infrared signals, radio signals, or a data network such as Ethernet, WLAN, or WiMax. In alternative embodiments, the controlling device 106 is a remote control, a mobile device such as a cell phone, a personal computer or a laptop.

Figure 2A:
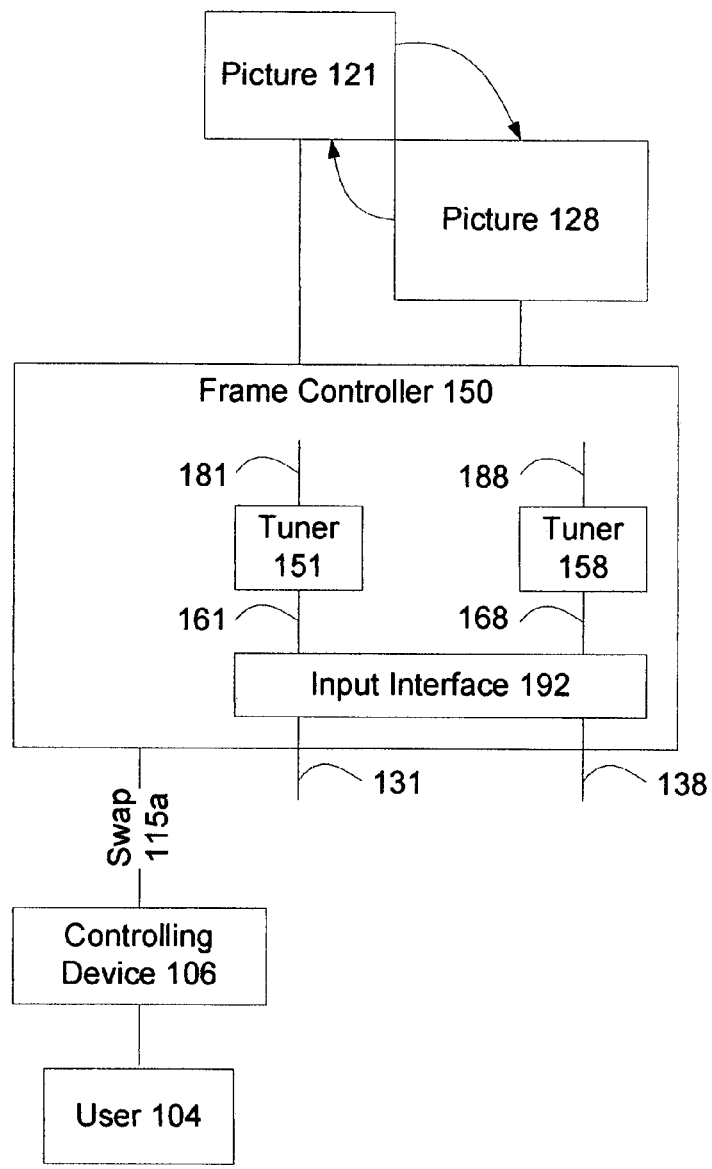
FIG. 2a is a schematic diagram depicting a process to swap the television channel of two displayed pictures, in accordance with an embodiment of the present invention.
Figure 2B:
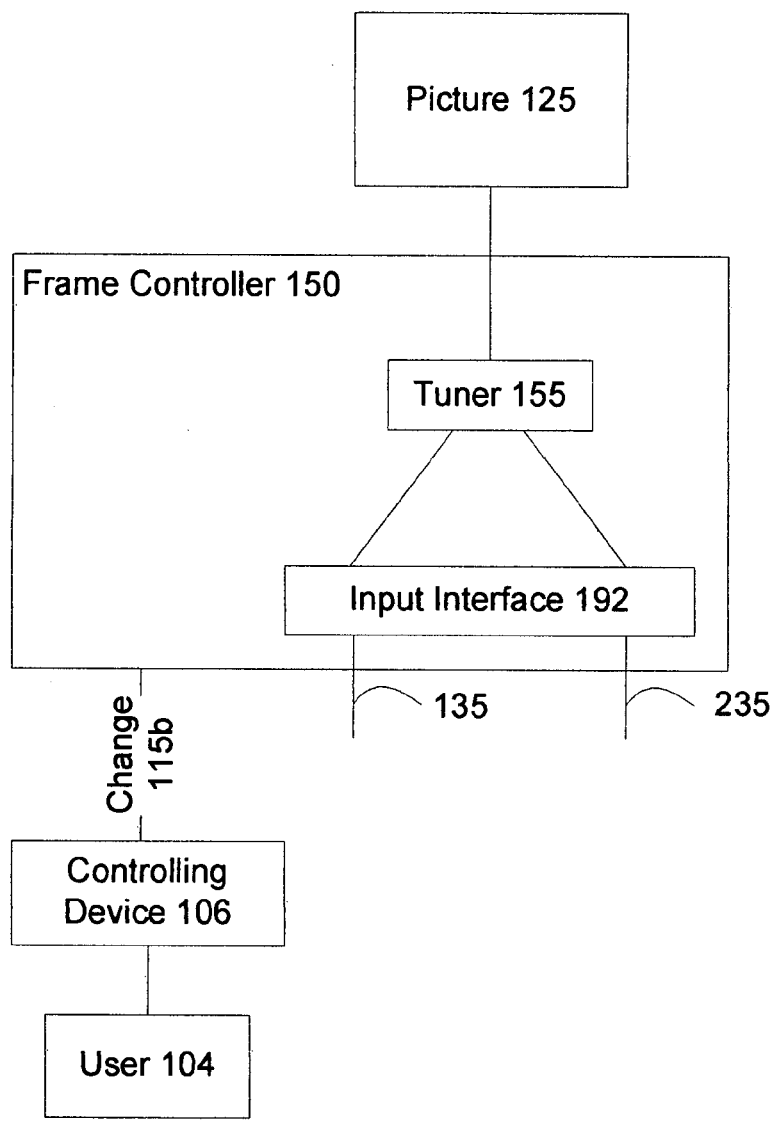
FIG. 2b is a schematic diagram depicting a process to change a television channel of a display picture, in accordance with an embodiment of the present invention.

FIGS. 2a and 2b are block diagrams illustrating picture swapping and changing operations, respectively, in an exemplary embodiment of the invention.

In FIG. 2a, frame controller 150 provides a swap operation 115a swapping picture 121 with picture 128. User 104 selects, using controlling device 106, picture 121 and picture 128. The user 104 then selects swap operation 115a. In response to receiving the swap operation 115a signal from the controlling device 106, frame controller 150 informs tuner 151 to transform channel signal 161 to sub-frame signal 181 using a large picture resolution of picture 128. Frame controller 150 informs tuner 158 to transform channel signal 168 to sub-frame signal 188 using a small picture resolution of picture 121. When frame controller 150 composes sub-frame signals 181, 183, 185, 187, 188 and 189, frame controller 150 places sub-frame signal 188 to the location of picture 121 and sub-frame signal 181 to the location of picture 128.

The replacement of picture 128 by picture 121 may be performed in several ways. In an embodiment, frame controller 150 informs tuner 158 to select television channel 131. Tuner 158 receives channel signals 168 from television channel 131, transforms channel signals 168 to sub-frame signal 188. In another embodiment, frame controller 150 informs tuner 158 not to transform channel signal 168. Frame controller 150 informs tuner 151 to transform channel signal 161 to sub-frame signal 188 using picture resolution of picture 128, in addition to sub-frame signal 181 using current small picture resolution of picture 121. Frame controller places sub-frame signal 188 to the location of picture 128.

A user 104 may swap two small pictures, such as picture 123 and picture 125, rather than swapping a small picture and a large picture.

As depicted in FIG. 2b, in an embodiment, frame controller 150 provides a change operation 115b to change a television channel of a displayed picture. In exemplary operation, a user 104 selects picture 125, which is displaying television channel 135. Next, user 104 selects the change channel operation 115b using the controlling device 106, and further selects another television channel to display. In one embodiment, the user 104 selects the new television channel directly, whereas, in an alternative embodiments, the user 104 selects the next channel in a sequence of channels, or the previous channel, or another video source altogether, such as DVD player. In one embodiment, the user 104 keys in a television channel number or name. Frame controller 150 determines television channel 235 and informs tuner 155 to switch to television channel 235.

Figure 3A:
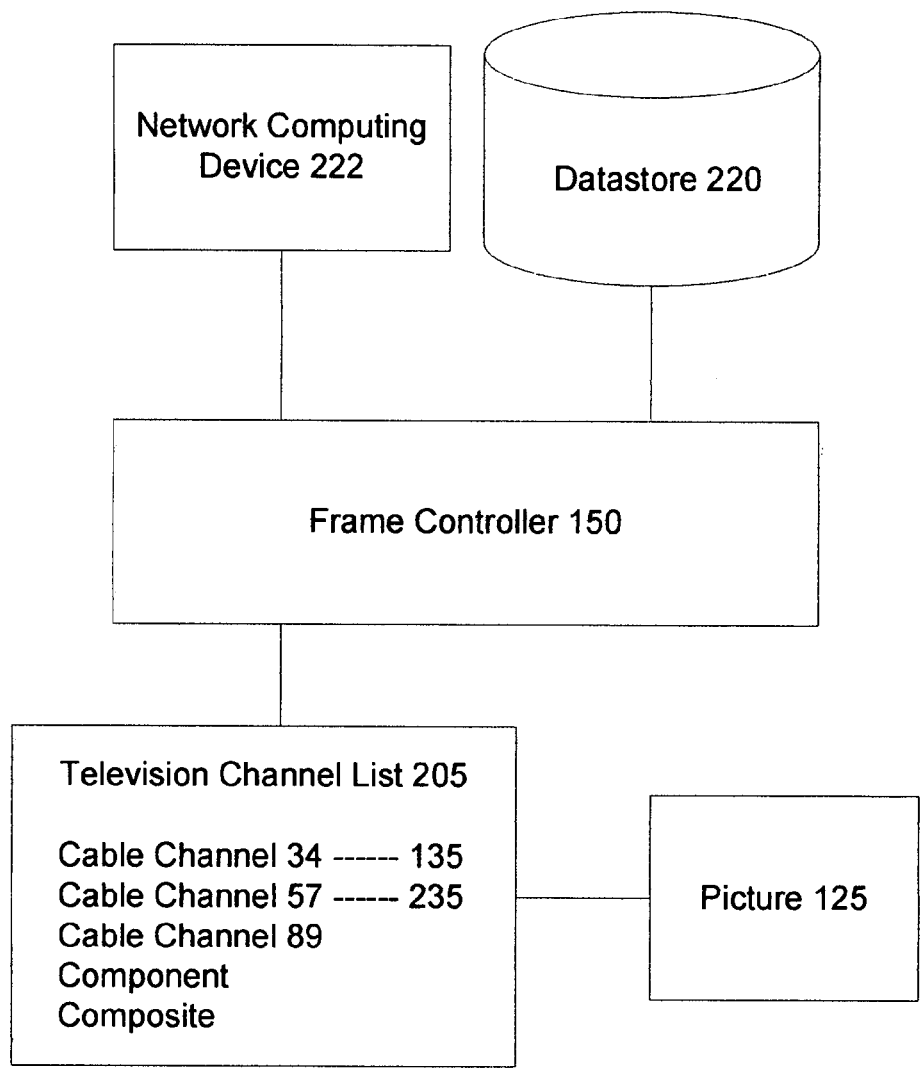
FIG. 3a is a schematic diagram depicting the use of a television channel selection list for selecting a television channel to display, in accordance with an embodiment of the present invention.
Figure 3B:
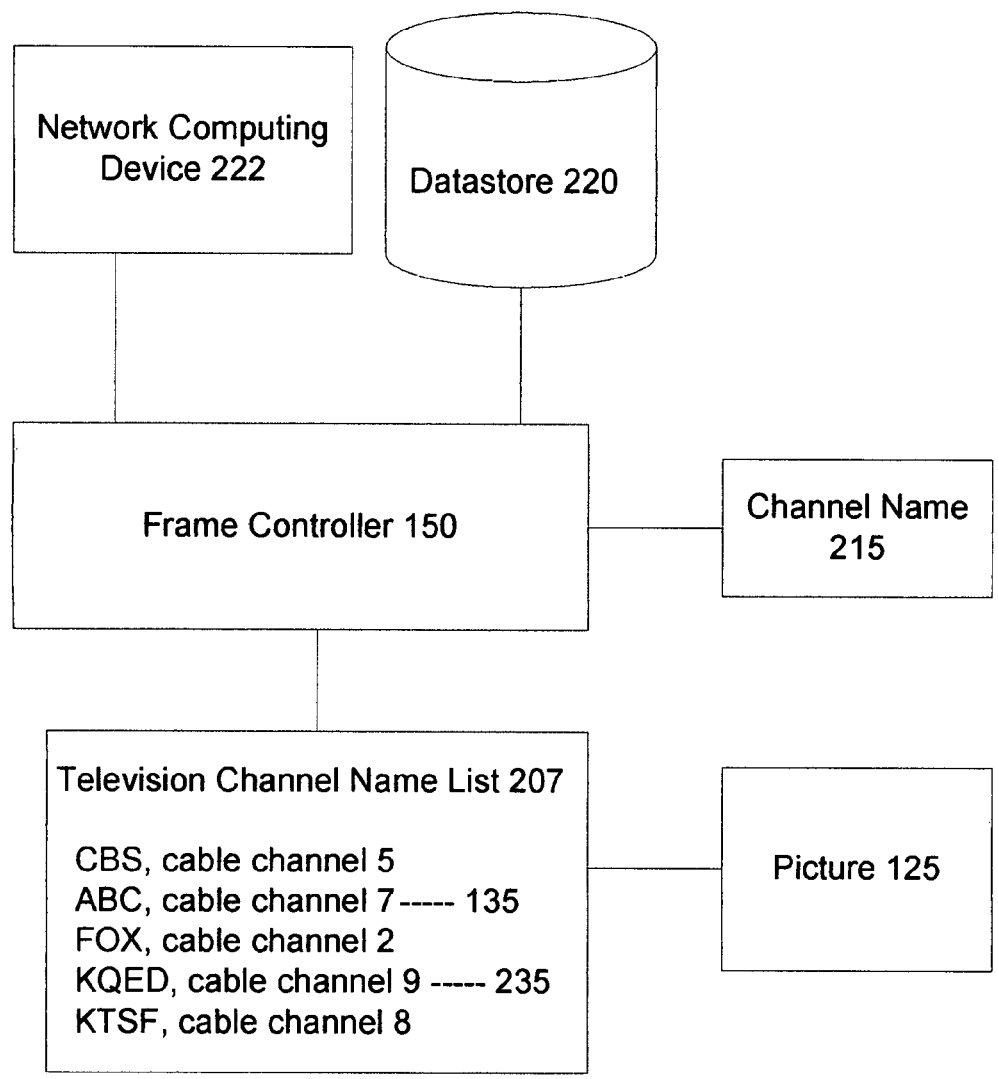
FIG. 3b is a schematic diagram depicting the use of a television channel name list for selecting a television channel to display, in accordance with an embodiment of the present invention.

FIGS. 3a and 3b illustrate the use of a television channel selection list and a television channel name list, respectively, for selecting a television channel to display.

In one embodiment, frame controller 150 determines the second television channel 235 based on picture 125. For example, picture 125 may be associated with a pre-determined television channel list 205 for picture 125. FIG. 3a illustrates television channel list 205 for picture 125. Picture 125 is currently displaying television channel 135. When the user 104 selects the next television channel, frame controller 150 determines the second television channel 235 from television channel list 205 to be cable channel 57. In another, frame controller 150 connects to a datastore 220 that includes television channel list 205. Frame controller 150 matches picture 125 against datastore 220 and retrieves television channel list 205.

In another embodiment, frame controller 150 queries a network computing device 222 that includes television channel list 205. Frame controller 150 sends picture 125 and television channel 135 to computing device 222. Frame controller 150 obtains television channel 235 from computing device 222.

In an embodiment, the user 104 specifies television channel 235 by channel name 215, as depicted in FIG. 3b. Frame controller 150 matches channel name 215 against television channel name list 207 and retrieves the corresponding television channel 235. In one embodiment, frame controller 150 connects a datastore 220 that includes television channel name list 207. Frame controller 150 matches picture 125 against datastore 220 and retrieves television channel name list 207.

In another embodiment, frame controller 150 queries a network computing device 222 that includes television channel name list 207. Frame controller 150 sends picture 125 and channel name 215 to computing device 222. Frame controller 150 obtains television channel 235 from computing device 222.

Numerous other operations may be performed by the frame controller 150 as directed by a user 104. For example, operation 115 can be used to increase or reduce the size of picture 128. In one embodiment, operation 115 can be to swap the picture whose sounds are audible between picture 123 and picture 128. In another embodiment, frame controller 150 connects to a recorder such as a DVD recorder, and operation 115 can be used to record television channel 135 of picture 125. In yet another embodiment, operation 115 can be used to restart a television program of television channel 137 of picture 127, or to pause, fast forward or fast backward television channel 137 of picture 127.

A television channel, as used herein, includes the common understanding as a source of serially-available video streams, without limitation.

Figure 4:
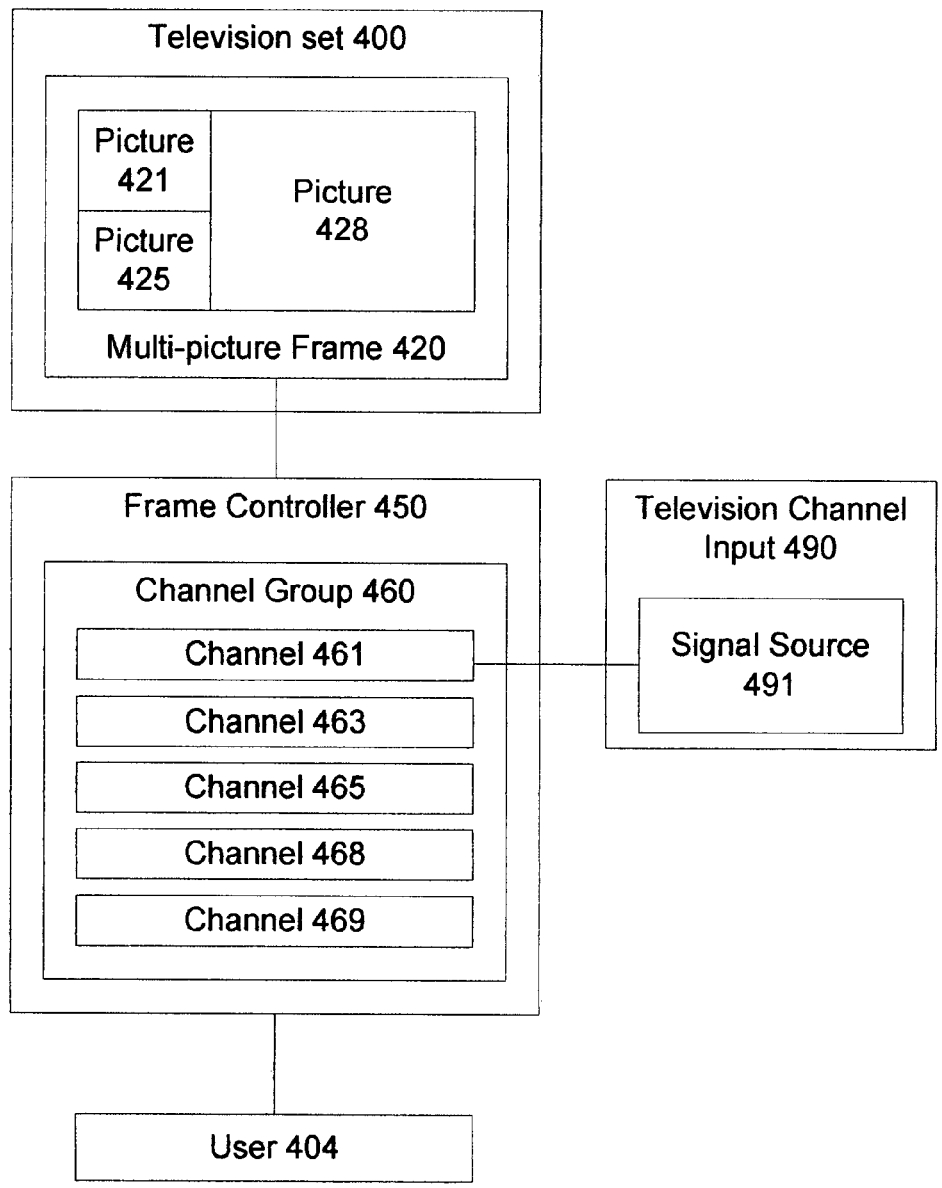
FIG. 4 is a schematic diagram illustrating a television set displaying a television channel group, in accordance with an embodiment of the present invention.

FIG. 4 illustrates a television set displaying a television channel group. Television set 400 is an electronic device that receives images and sounds. In an embodiment, television set 400 receives images and sounds signals from a television channel 461, which, in turn, relates to images and sounds signal source 491. Signal source 491 may be from a broadcast television network, a cable television network, a satellite television network, an Internet Protocol television (IPTV) network, a VCR, a DVD player, a digital video recorder (DVR), a set top box, or another images and sounds signal source.

Exemplary television set 400 displays a multi-picture frame 420, which includes multiple pictures 421, 425, and 428. In an embodiment of the invention, picture 428 is a major picture having a display size larger than the smaller pictures 421 and 425. In other embodiments, the layout, size and number of the multiple pictures may be different than shown in the figure.

Multi-picture frame 420 is controlled by frame controller 450, which includes channel group 460, which further includes a plurality of channels. Channel group 460 relates to an attribute shared by all channels in the channel group 460. Multi-picture frame 420 displays channel group 460, although typically channel group 460 includes more channels than number of pictures that are simultaneously displayed in multi-picture frame 420. For example, in FIG. 4, channel group 460 includes channels 461, 463, 465, 468 and 469. Frame controller 450 displays channel group 460 in multi-picture frame 420. Frame controller 450 displays channels 461, 465 and 468 onto pictures 421, 425 and 428 respectively. Channels 463 and 469 are not displayed in multi-picture frame 420.

In an embodiment of the invention, frame controller 450 is included in television set 400, and connects to television set 400 through an interface, such as an RF interface, a HDMI interface, a S-video interface, a component interface, a composite interface, a network interface, or a wireless network interface such as Wireless Local Area Network (WLAN), Worldwide Interoperability for Microwave Access (WiMax), or an Ultra-Wideband (UWB) network.

An exemplary frame controller 450 may connect to television channel input 490, such as cable television network, satellite television network, IPTV, Internet, DVD player, or other video sources. Television channel input 490 may include a plurality of signal sources such as signal source 491. The frame controller 450 maps channels in channel group 460 to television channel input 490. In one embodiment, channel group 460 includes the mapping of channels 461, 463, 465, 468, and 469 to their corresponding signal sources in television channel input 490. Typically channel group 460 includes fewer channels than the number of signal sources in television channel input 490.

In a typical embodiment, a user 404 interacts with the frame controller 450 to instruct an operation onto channel group 460.

Figure 5A:
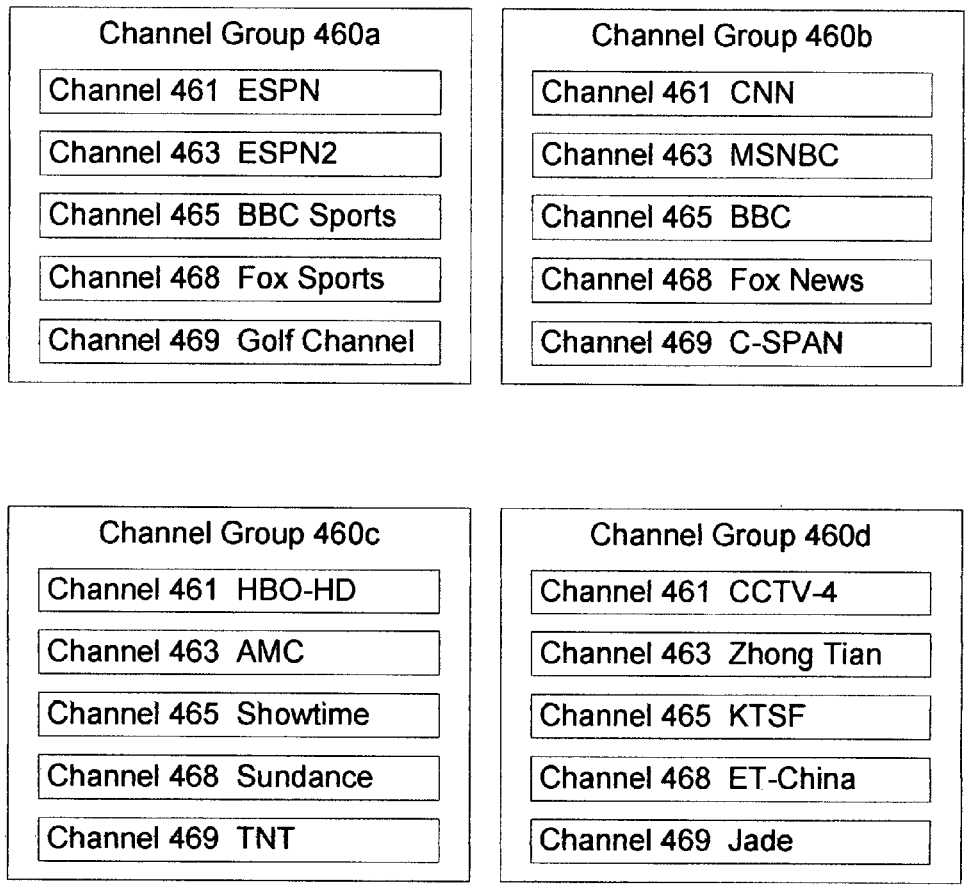
FIG. 5a is a schematic diagram illustrating a channel group, in accordance with an embodiment of the present invention.

FIG. 5a-5b illustrates channel group 460. In one embodiment, channel group 460 relates to a common theme. Channels 461, 463, 465, 468 and 469 relate to the theme. For example, channel group 460a relates to sports; channel group 460b relates to news; channel group 460c relates to movies.

In another embodiment, channel group 460 relates to an ethnic culture. Channels 461, 463, 465, 468 and 469 relate to the ethnic culture. For example, channel group 460d relates to Chinese channels; channel group 460e relates to Latin American channels.

In another embodiment, channel group 460 relates to an age group. Channels 461, 463, 465, 468 and 469 relate to the age group. For example channel group 460f relates to channels appropriate for children; channel group 460g relates to channels appropriate for seniors; and channel group 460h relates to channels having mature content for adults.

In another embodiment, channel group 460 relates to common attributes shared by all channels included in channel group 460. Channel groups are well-suited to include channels having one or more common attributes. For example, exemplary channel groups mentioned herein include common attributes: a sports channel group sharing the sports attribute, a news channel group sharing the news attribute, a movie channel group sharing the movie attribute, a Chinese channel group sharing a Chinese language and/or culture attribute, etc. There are numerous attributes about which channel groups may be formed, all of which are not enumerated herein.

In one embodiment, the user 404 may specify the common attributes by inputting it. In another embodiment, the user 404 may select the common attribute from a list.

Figure 6:
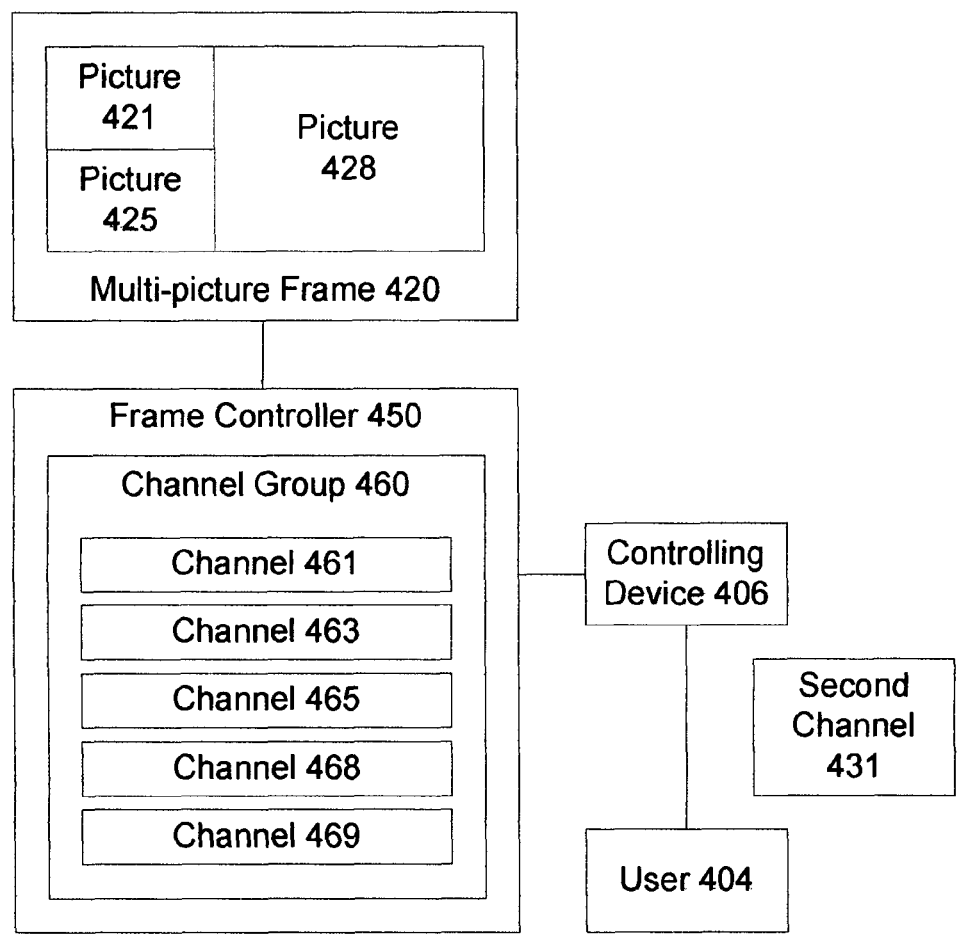
FIG. 6 is a schematic diagram illustrating an operation on a channel group, in accordance with an embodiment of the present invention.

FIG. 6 illustrates an operation on a channel group. Frame controller 450 controls operations of multi-picture frame 420. User 404 uses a controlling device 406 to instruct frame controller 450. Frame controller 450 connects to controlling device 406 through for example infrared signals, radio signals, or a data network such as Ethernet, WLAN, or WiMax. In one embodiment, controlling device 406 is a remote control, a mobile device such as a cell phone, a personal computer or a laptop.

In an embodiment, the user 404 selects picture 421 and selects a second channel 431. The user 404 may then select the next channel. Frame controller 450 determines second channel 431 based on channel group 460 and channel 461. In another embodiment, channel 463 is the next channel after channel 461 in channel group 460. Frame controller 450 determines second channel 431 to be channel 463.

In an embodiment, the user 404 selects the previous channel. Frame controller 450 determines second channel 431 to be channel 469 as channel 469 is the previous channel of channel 461 in channel group 460. Frame controller 450 then displays second channel 431 onto picture 421.

In another embodiment, the user 404 selects picture 425 or picture 428 before selecting second channel 431. In this embodiment, frame controller 450 may determine the second channel 431 based on the selected picture.

In another embodiment, the user 404 selects second channel 431 by specifying a channel name or a channel number. The frame controller 450 matches the specified channel name or channel number against channel group 460 and sets second channel 431 to a matched channel in channel group 460.

Figure 7:
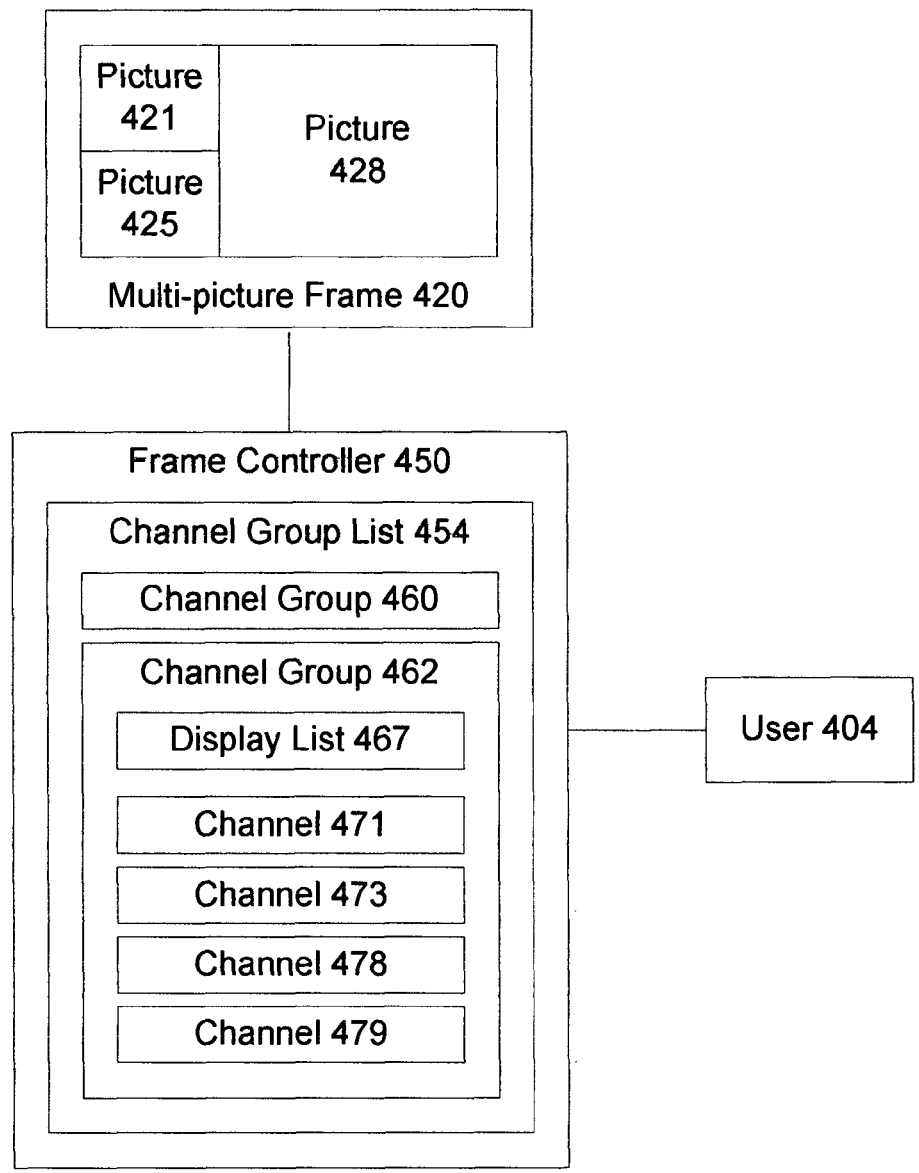
FIG. 7 is a schematic diagram illustrating a television set displaying a television channel group, in accordance with an embodiment of the present invention.

FIG. 7 illustrates an exemplary operation to change to a second channel group. The frame controller 450 includes a channel group list 454, which includes a plurality of channel groups, particularly channel group 460 and channel group 462. The user 404 selects channel group 462 to be displayed on multi-picture frame 420. In one embodiment, user 404 selects a next channel group, and the frame controller 450 matches the channel group 460 against the channel group list 454, and determines channel group 462 as the next channel group after channel group 460. In another embodiment, the user 404 selects a previous channel group, and frame controller 450 matches channel group 460 against channel group list 454 and determines channel group 462 as the previous channel group before channel group 460. In another embodiment, the user 404 selects a name or a number. Frame controller 450 matches the selected name or number against channel group list 454 and determines channel group 462 as a matched channel group in channel group list 454.

After determining channel group 462, frame controller 450 displays channel group 462 to multi-picture frame 420. Channel group 462 includes channels 471, 473, 478 and 479. In one embodiment, frame controller 450 displays channel 471 onto picture 421, channel 473 onto picture 425, and channel 479 onto picture 428. In one embodiment, frame controller 450 randomly displays channels in channel group 462 onto pictures in multi-picture frame 420. In another embodiment, channel group 462 includes a display list 467 between channels in channel group 462 and pictures in multi-picture frame 420. The frame controller 450 then displays based on the display list 467.

Figure 8:
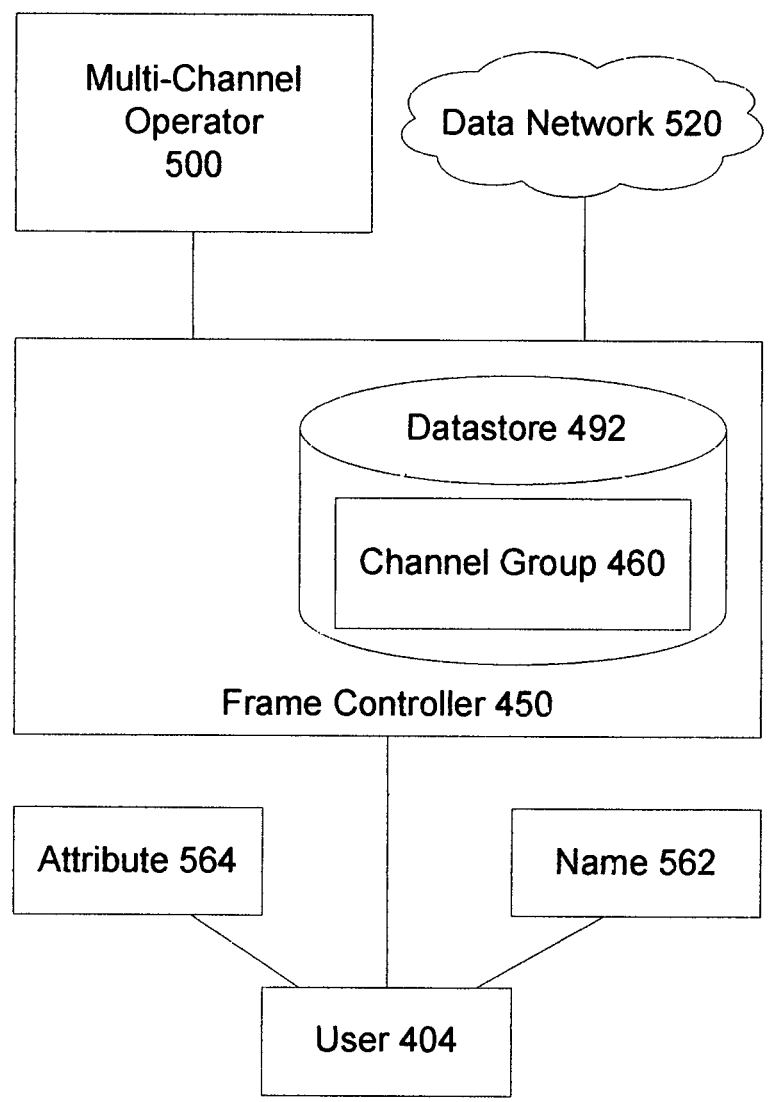
FIG. 8 is a schematic diagram depicting a process to configure a channel group, in accordance with an embodiment of the present invention.

FIG. 8 illustrates an exemplary process to configure a channel group. In one embodiment, frame controller 450 includes a datastore 492. Datastore 492 includes channel group 460. In another embodiment, channel group 460 is pre-determined by a manufacturer. In one embodiment, channel group 460 is pre-determined by a retailer selling frame controller 450. In one embodiment, frame controller 450 connects to a multi-channel operator 500. Multi-channel operator 500 provides television channel input. In one embodiment multi-channel operator 500 is a cable television network operator, a satellite television network operator, a broadcast television network operator, Internet television provider, or an IPTV network operator. Frame controller 450 obtains channel group 460 from multi-channel operator 500.

In another embodiment, frame controller 450 connects to a data network 520. Frame controller 450 obtains channel group 460 from data network 520. In one embodiment, frame controller 450 connects to multi-channel operator 500 using data network 520. In another embodiment, frame controller 450 obtains channel group 460 from an Internet web site where data network 520 includes Internet.

User 404 selects name 562, and frame controller 450 queries the multi-channel operator 500 and obtains channel group 460, using the user-selected name 562. In another embodiment, frame controller 450 queries data network 520 for channel group 460, using name 562.

In another one embodiment, user 404 selects an attribute 564, and the frame controller 450 queries multi-channel operator 500 using attribute 564 to obtain channel group 460. In another embodiment, frame controller 450 queries data network 520 using attribute 564 for channel group 460.

In another embodiment, the user 404 creates channel group 460, such as by specifying a name or number for the channel group 460. In one embodiment, user 404 specifies a common attribute for channel group 460. The user 404 specifies channels 461, 463, 465, 468 and 469 to be included in channel group 460. The frame controller 450 stores the created channel group 460 into datastore 492.

In another embodiment, the frame controller 450 modifies an existing channel group 460 by including channel 461 into channel group 460. In one embodiment, frame controller 450 obtains channel 461 from data network 520. Alternatively, frame controller 450 may obtain channel 461 from the user 404, or from another source.

In an embodiment, the frame controller 450 removes channel 463 from channel group 460. Frame controller 450 may determine to remove channel 463 from information obtained through data network 520, or by instruction from user 404.

Figure 9:
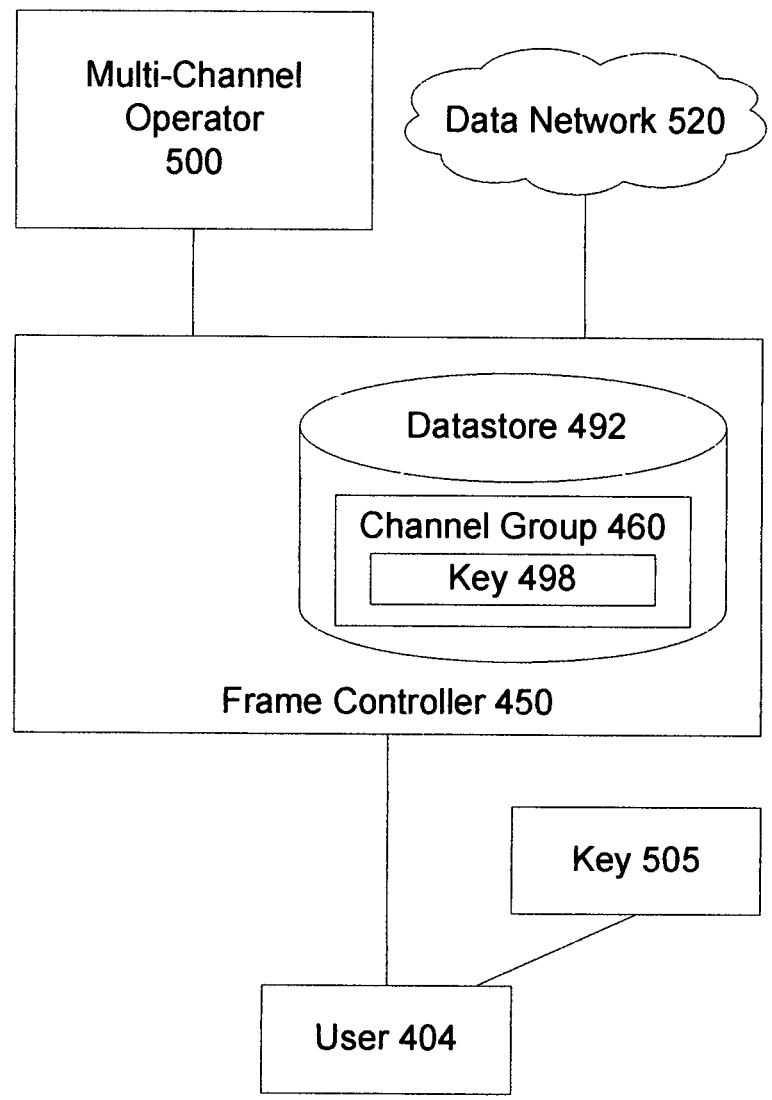
FIG. 9 is a schematic diagram depicting a process to limit access to a channel group, in accordance with an embodiment of the present invention.

FIG. 9 illustrates an exemplary process to limit access to a channel group. In one embodiment, channel group 460 includes a key 498. When user 404 selects channel group 460, user 404 provides a key 505 to the frame controller 450. The frame controller 450 then matches the key 505 against key 498, and allows user 404 to access channel group 460 if there is a match. In another embodiment, access to a channel within channel group 460 is controlled by the frame controller 450 using the keys 505, 498.

In an embodiment, frame controller 450 sends a key 505 to multi-channel operator 500 or data network 520 to verify the key 505 before allowing user 404 to access channel group 460.

In an embodiment, channel group 460 relates to adult content, and key 498 prevents children from accessing channel group 460. In another embodiment, channel group 460 relates to premium content, and the user 404 obtains the key 505 and uses it to access channel group 460. In various embodiments, the user 404 obtains the key 505 from a multi-channel operator 500, a merchant, or from data network 520.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A television system comprising:
   an input interface for receiving video data from a plurality of video streams and transferring the video data to a frame controller in communication with a television display;
   the frame controller causing the video data from each of the plurality of different video streams to be displayed in a separate frame on the television display, each frame occupying an area of the television display separate from an area occupied by any other frame, and at least two of the frames being of different sizes;
   the frame controller for receiving a user selection of a channel group comprising a plurality of channels, each channel of the channel group comprising at least one serially-available video stream sharing at least one common attribute;
   in response to the user selection, the frame controller further causing display of two or more channels of the channel group, each fully contained within one of the separate frames on the television display;
   the frame controller further receiving a user instruction to change the display in a given frame on the television display to a given channel of the channel group, wherein the given channel is not currently displayed on the television display; and
   in response to the user instruction, the frame controller further causing the display of the given channel in the given frame.

2. The television system according to claim 1, wherein the input interface receives video data from one or more sources selected from the list including broadcast television, cable television, satellite television, video cassette player (VCR), and digital versatile disk (DVD).

3. The television system according to claim 1, wherein the input interface receives video data in one or more of the following formats: NTSC, PAL, and HDTV.

4. The television system according to claim 1, wherein the input interface comprises one or more of a coaxial interface, a radio frequency (RF) interface, a high-definition multimedia interface (HDMI), component interface, composite interface, an Ethernet interface, or a wireless network interface.

5. The television system according to claim 1, wherein the frame controller is in communication with the television display through an output interface, the output interface comprising an RF interface, an HDMI interface, an S-video interface, a component interface or a composite interface.

6. The television system according to claim 5, wherein the output interface includes a wireless network.

7. The television system according to claim 6, wherein the wireless network is a Wireless Local Area Network (WLAN), a Worldwide Interoperability for Microwave Access (WiMax) network, or and Ultra-wideband (UWB) network.

8. The television system according to claim 1, wherein the common attribute for the channel group is one of sports, news, or movies.

9. The television system according to claim 1, wherein the common attribute for the channel group is one of ethnicity, language or culture.

10. The television system according to claim 1, wherein the common attribute for the channel group is one of age appropriateness, age preference, or age restricted.

11. The television system according to claim 1, wherein the common attribute for the channel group is selected by a user.

12. The television system according to claim 11, wherein the user selects the common attribute from a list of common attributes.

13. The television system according to claim 1, wherein a user provides a key to the frame controller when the user attempts to access the channel group.

14. The television system according to claim 13, wherein the user provides a key to the frame controller when the user attempts to access a displayed channel from the channel group.

15. The television system according to claim 13, wherein the frame controller verifies the key with a multi-channel operator or data network to control access to the displayed channel selected from the channel group.

16. The television system according to claim 1, wherein in response to a second user selection to change the television display to display a second channel group comprising a second plurality of channels, each channel of the second plurality of channels comprising at least one serially-available video stream sharing at least a second common attribute, the frame controller further causing display of two or more channels of the second channel group, each fully contained with the one of the separate frames on the television display.

17. The television system according to claim 1, wherein the channel group comprises a list of the plurality of channels, wherein the frame controller further:
   receives a second user selection of a next or a previous channel of the channel group for the given frame;
   determines the next or the previous channel on the list; and
   causes the display of the next or the previous channel within the given frame.

18. The television system according to claim 1, wherein the frame controller further:
   receives a selection of a first frame and a second frame on the television display and a swap operation, the first frame displaying a first channel of the channel group, and the second frame displaying a second channel of the channel group; and
   in response, displays the second channel in the first frame and displays the first channel in the second frame.

19. The television system according to claim 18, wherein the frame controller further:
   receives the selection of the first frame and the second frame on the television display and the selection of the swap operation, the first frame displaying a first video data from a first video stream received by a first tuner of the frame controller, the second frame displaying a second video data from a second video stream received by a second tuner of the frame controller;
   informs the first tuner to transform the first video stream to a resolution of the second frame;
   informs the second tuner to transform the second video stream to a resolution of the first frame; and
   displays the transformed first video stream in the second frame and the transformed second video stream in the first frame.

20. The television system according to claim 1, wherein the user instruction is received from a mobile computing device.

21. A method of displaying video from a plurality of video streams on a television display, the method comprising:
   inputting video data from the plurality of video streams to a frame controller;
   causing, by the frame controller, the video data from each of the plurality of video streams to be displayed in a separate frame on the television display, each frame occupying an area of the television display separate from an area occupied by any other frame, and at least two of the frames being of different sizes;
   receiving, by the frame controller, a user selection of a channel group comprising a plurality of channels, each channel of the channel group comprising at least one serially-available video stream sharing at least one common attribute;
   in response to the user selection, causing, by the frame controller, display of two or more channels of the channel group, each fully contained within one of the separate frames on the television display;
   receiving, by the frame controller, a user instruction to change the display in a given frame on the television display to a given channel of the channel group, wherein the given channel is not currently displayed on the television display; and
   in response to the user instruction, causing, by the frame controller, the display of the given channel in the given frame.

22. The method according to claim 21, wherein the common attribute for the channel group is one of sports, news, or movies.

23. The method according to claim 21, wherein the common attribute for the channel group is one of ethnicity, language or culture.

24. The method according to claim 21, wherein the common attribute for the channel group is one of age appropriateness, age preference, or age restricted.

25. The method according to claim 21, wherein the common attribute for the channel group is user-selected.

26. The method according to claim 25, wherein the user-selected common attribute is selected from a list of common attributes.

27. The method according to claim 21, further comprising:
   providing a key to the frame controller by a user when the user attempts to access the channel group.

28. The method according to claim 21, further comprising:
   verifying a key provided by a user with a multi-channel operator or data network by the frame controller to control access to the channel group.

29. The method according to claim 21, further comprising:
   verifying a key provided by a user with a multi-channel operator or data network by the frame controller to control access to a displayed channel from the channel group.

30. The method according to claim 21, further comprising:
   in response to a second user selection to change the television display to display a second channel group comprising a second plurality of channels, each channel of the second plurality of channels comprising at least one serially-available video stream sharing at least a second common attribute, displaying two or more channels of the second channel group, each fully contained with the one of the separate frames on the television display.

31. The method according to claim 21, wherein the channel group comprises a list of the plurality of channels, wherein the method further comprises:
   receiving a second user selection of a next or a previous channel of the channel group for the given frame;
   determining the next or the previous channel on the list and causing the display of the next or the previous channel within the given frame.

32. The method according to claim 21, further comprising:
   receiving, by the frame controller, a selection of a first frame and a second frame on the television display and a swap operation, the first frame displaying a first channel of the channel group, and the second frame displaying a second channel of the channel group; and
   in response, displaying, by the frame controller, the second channel in the first frame and displays the first channel in the second frame.

33. The method according claim 32, further comprising:
   receiving the selection of the first frame and the second frame on the television display and the selection of the swap operation, the first frame displaying a first video data from a first video stream received by a first tuner of the frame controller, the second frame displaying a second video data from a second video stream received by a second tuner of the frame controller;
   informing the first tuner to transform the first video stream to a resolution of the second frame;
   informing the second tuner to transform the second video stream to a resolution of the first frame; and
   displaying the transformed first video stream in the second frame and the transformed second video stream in the first frame.

34. The method according to claim 21, wherein the user instruction is received from a mobile computing device.

* * * * *